Patented Nov. 16, 1926.

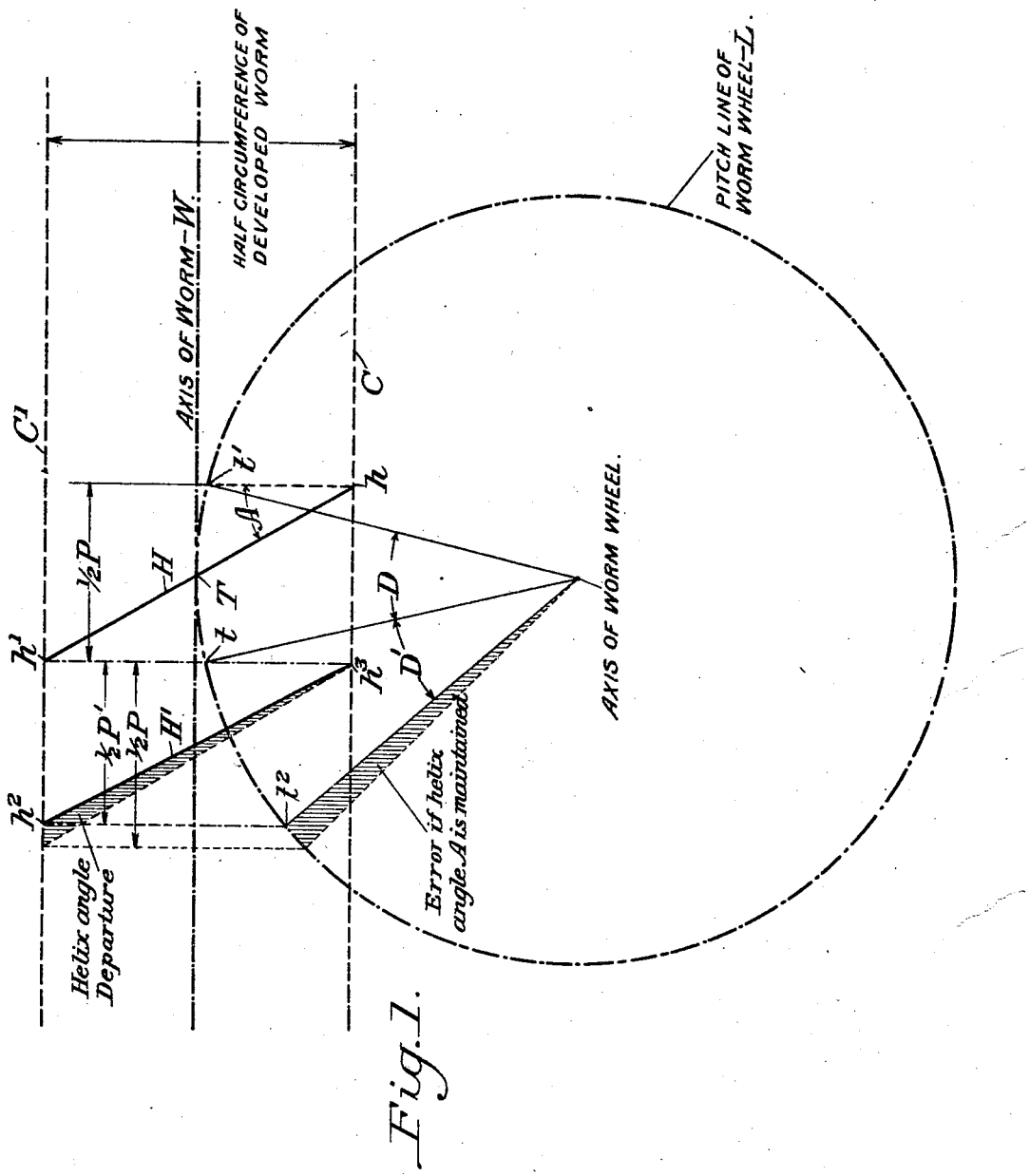

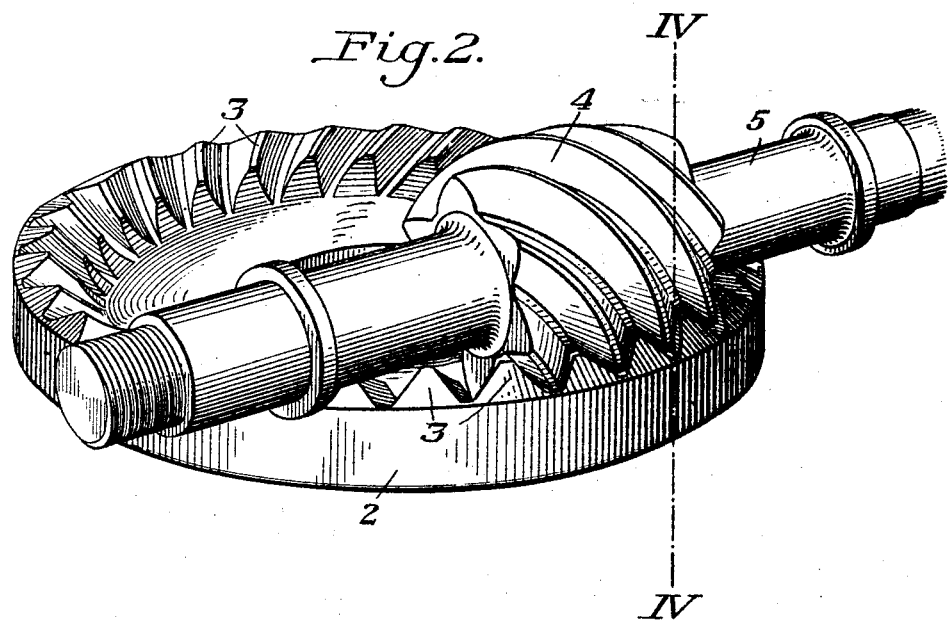
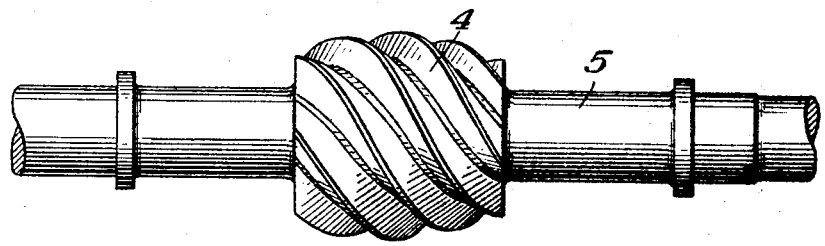
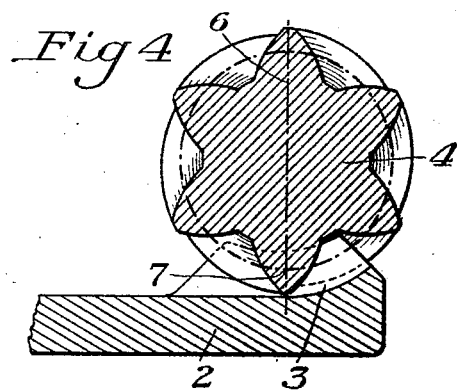

1,606,759

UNITED STATES PATENT OFFICE.

ALBERT W. GRIFFITH, OF PITTSBURGH, PENNSYLVANIA; FRANCES GRIFFITH, EXECUTRIX OF THE SAID ALBERT W. GRIFFITH, DECEASED, ASSIGNOR TO GRIFFITH PATENTS COMPANY, OF PITTSBURGH, PENNSYLVANIA, A CORPORATION OF DELAWARE.

GEARING.

Application filed August 1, 1923. Serial No. 655,024.

The present invention relates broadly to gearing and more particularly to that type of gearing ordinarily referred to as worm gearing, although the present invention possesses some of the desired attributes both of worm gears and spiral gears.

One of the objects of the present invention is to provide a construction particularly adapted for the efficient transmission of power between non-parallel non-intersecting shafts, such gearing being especially useful in automotive vehicles as a drive between the propeller shaft and rear axle.

At the present time, it is customary in a number of automotive vehicles to utilize worm gearing for transmitting power to the rear axle. Gearing of this character provides a powerful drive and permits the desired gear ratio to be easily obtained. Certain objections to this type of gearing have arisen, however, due to the projection for substantially a full diameter of the worm beyond the periphery of the worm wheel. This materially reduces the amount of clearance between the top of the differential housing and the body of the vehicle, thereby necessitating a special form of spring suspension.

It has heretofore been proposed, as illustrated, for example, in the patent to Fowler, No. 493,493 of March 14, 1893, to provide modified forms of worm gearing in which the worm occupies a position within the periphery and laterally of the worm wheel. From a practical standpoint, however, constructions of this character as heretofore designed have not only been inefficient, but have been substantially inoperative for the purpose intended by reason of the disregard of certain inherent defects in the utilization of a worm having a constant helix angle.

The present invention also has for one of its objects, the substantial elimination of the spreading force which is usually present in worm gearing and tending to deflect the worm wheel shaft. In accordance with this invention, the spreading force is directed substantially axially of the shaft and any tendency to bend the same is thereby eliminated.

In the accompanying drawings, I have shown for purposes of illustration only, one embodiment of this invention, it being understood that the drawings do not define the limits of my invention as changes in the construction disclosed therein may be made without departing from the spirit of the invention or scope of my broader claims.

In the drawings:

Figure 1 is a diagrammatic view illustrating one method of determining and one type of construction of a worm adapted to be utilized in accordance with this invention;

Figure 2 is a perspective view illustrating a worm and wheel in cooperative engagement;

Figure 3 is a side elevation of the worm shown in Figure 1; and

Figure 4 is a transverse sectional view through a portion of the construction shown in Figure 1 on the plane of the line IV—IV.

As before pointed out, the preferred embodiment of my invention comprises a construction in which the teeth are formed on one of the side faces of the worm wheel and in which the axis of the worm extends at substantially right angles to the axis of the worm wheel and in a different plane, whereby non-parallel non-intersectng axes are secured, the axis of the worm preferably extending across the tooth face of the worm wheel to position the worm laterally of and substantially within the periphery of the wheel. It is with reference to a construction of this general character that the following description is applicable.

In carrying out the present invention, I preferably first determine the desired pitch line of the proposed worm wheel and the diameter of the worm to be used therewith. This pitch line may then be represented by a circle L, as indicated in Figure 1. The axis W of the worm is then drawn tangent to the pitch line L. The circumference of the worm may then be ascertained and a quarter of this circumference laid off on each side of the axis W, as indicated by lines C and C'. The distance between the lines C and C' will obviously represent half the circumference of a developed worm so that there may be indicated between these lines the developed helix H having a helix angle A, which angle is dependent upon the number of teeth originally selected for the worm wheel. The developed helix H is drawn through the point of tangency T between the pitch line of the worm wheel and the axis of the worm, which point may be designated the principal point of contact, and terminates in the lines C and C' at $h$ and $h'$ respectively.

Lines perpendicular to the axis of the worm are drawn through $h$ and $h'$ and the distance between their intersections $t$ and $t'$ with the pitch line L represents the distance moved by a tooth on the worm wheel in a half revolution of the worm. This linear distance is expressed on the diagram as ½ P, the corresponding angular distance turned through by the worm wheel being represented as D.

Obviously, any other point on the pitch line L, as, for example $t^2$, must move through an equal angle D' during a half revolution of the worm, and if an efficient gear having long life is to be secured, the worm must be in contact with the point $t^2$ throughout this half revolution. If then, the point $t^2$ is projected upwardly to C' in the point $h^2$ while the point $t$, which is the other limit of the angle D', is projected to the line C in the point $h^3$, a line H' connecting the points $h^2$ and $h^3$ will represent the proper helix line for this portion of the worm. The corresponding pitch is represented on the diagram as ½ P' and will be seen to vary considerably from the originally determined pitch at the center of the worm. The corresponding variation in the helix angle may be termed the helix angle departure and is represented by a shaded area on the diagram. Obviously, if the original helix angle A were maintained for this portion of the worm, the tendency would be to turn the worm wheel through an angle larger than the angle D or D', the difference being expressed by a shaded area on the diagram, designated "error if helix angle A is maintained".

It will be apparent that the above procedure may be carried out for very small portions of the worm and for very small angles corresponding to D, and in this manner the proper helix angle from end to end of the worm may be determined. It will be found that the helix angle constantly varies from the originally determined angle when this practice is pursued and a suitable worm may be readily determined. Obviously, the gear ratio is determined by the ratio of the number of teeth on the worm to the number of teeth on the wheel and any number of threads or teeth may be used on the worm, as desired. As soon as one is determined, the others, which are, of course, identical, may be laid off a suitable distance around the axis of the worm.

The proper worm having thus been determined, a suitable tooth shape may be selected and the worm cut in accordance therewith. Such a worm may be formed into a hob and used to generate the worm wheel in a gear cutting machine, as is well known.

Figures 2 and 3 illustrate a worm and wheel constructed according to my invention. Here a worm wheel 2 having teeth 3 on one side face thereof is shown in engagement with a worm 4 carried by a shaft 5. As will be seen from Figure 3, the outline of the worm departs from the usual cylindrical form and is slightly convex. I have found that this form enables me to provide a longer worm without interference.

Figure 4 shows a partial section taken through the worm and worm wheel and illustrates clearly the positioning of the teeth 3 with respect to the worm wheel 4. It will be seen that a line 6 drawn through the center of the worm 4 and parallel to the axis of the worm wheel 2 approximately divides the pitch line 7 of the tooth 3. Obviously, each tooth 3 may be extended on either side of the line 6, but the pitch line 7 will be substantially symmetrical about the line 6. Preferably, the line 6 bisects the pitch line 7.

In the gearing illustrated, the worm 4 has six threads and the worm wheel 2 has twenty-nine teeth. Dynamometer tests made with this gear have shown efficiencies of 94% at 1700 R. P. M. At this speed, the efficiency remains the same for practically all loads within the capacity of the gear. Correspondingly high efficiencies were found at all the speeds under varying load conditions. As my invention may be embodied in a reversible gearing, as in the illustrated form, the utility of the invention for automotive work will be apparent.

Gearing constructed according to this invention is very compact and may be placed in a housing of smaller diameter than an ordinary worm of the same load capacity. The two shafts are closer together and the housing may, therefore, be made lighter while preserving the same or greater rigidity.

The spreading force ordinarily tending to flex the worm wheel shaft is not present in this drive since the spreading force between the teeth is exerted longitudinally of the worm wheel shaft. In certain types of drive, this may be of considerable advantage since the shaft need only be strong enough to carry the load without the flexing and distortion ordinarily set up in worm wheel drives.

The advantages of the present invention arise from the provision of an improved gearing insuring both the necessary strength and rigidity in a more compact form.

Further advantages of the invention arise from the provision of a gearing in which the worm is laterally disposed with respect to the worm wheel and in which a line passing through the axis of the worm and extending parallel to the axis of the worm wheel passes through and preferably intersects a tooth on the worm wheel.

Still further advantages of the invention arise from the provision of a gearing particularly adapted for non-parallel non-intersecting shafts in which the principal point of contact between the gears lies outside of the shortest line connecting the shafts of the two gears, or such line projected.

I claim:

1. In worm gearing, a worm wheel having fixed teeth of generally spiral form on one side face thereof, and a worm disposed laterally of said wheel and having a tooth adapted to mesh with the teeth on said wheel, said worm having a varying helix angle, and being adapted to make surface contact with a plurality of teeth on the wheel at all times.

2. In worm gearing, a worm wheel having fixed teeth of generally spiral form on one side face thereof, and a worm disposed laterally of said wheel and having a tooth adapted to mesh with the teeth of said wheel, said worm having a constantly changing helix angle, and being adapted to make surface contact with a plurality of teeth on the wheel at all times.

3. A worm and gear connection for non-parallel non-intersecting shafts, having its principal point of contact lying outside the shortest line connecting the two shafts or such line projected, the worm wheel having fixed teeth of generally spiral form, the worm being adapted to make surface contact with a plurality of teeth on the wheel at all times.

4. A worm and gear connection for non-parallel non-intersecting shafts having its principal point of contact lying outside the shortest line connecting the two shafts or such line projected, the wheel having fixed teeth of generally spiral form and the worm being adapted to make surface contact with a plurality of teeth on the wheel at all times.

5. In a worm gearing, a worm wheel having fixed teeth of generally spiral form on a side face thereof, the pitch line of each of said teeth being substantially symmetrical about a line parallel to the axis of rotation of the wheel, and a worm disposed laterally of said wheel and having a substantially continuous and uninterrupted tooth adapted to mesh with the teeth of said wheel, said worm having a changing helix angle.

6. As an article of manufacture, a worm convex from end to end and provided with a tooth having a varying helix angle.

7. As an article of manufacture, a worm convex from end to end and provided with a tooth having a constantly changing helix angle.

8. As an article of manufacture, a worm convex from end to end and provided with a tooth having a helix angle increasing from each end toward the center.

In testimony whereof I have hereunto set my hand.

ALBERT W. GRIFFITH.